Figure 1:
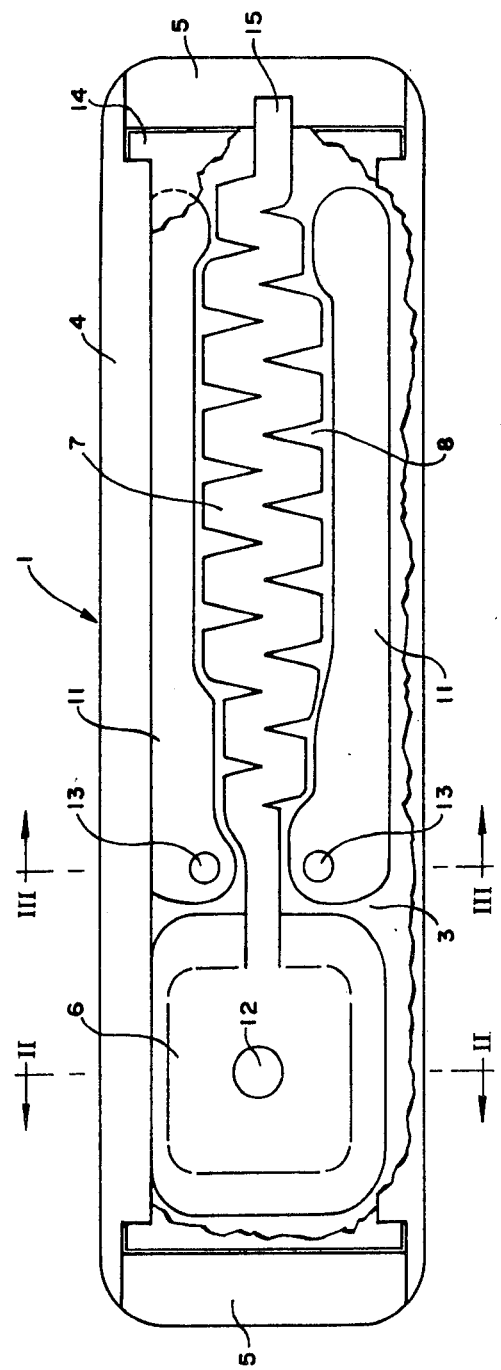

United States Patent [19]

Mehoudar

[11] 4,413,786
[45] Nov. 8, 1983

[54] EMITTER UNIT

[75] Inventor: Raphael Mehoudar, Tel-Aviv, Israel

[73] Assignee: Hydro-Plan Engineering Ltd., Tel-Aviv, Israel

[21] Appl. No.: 209,306

[22] Filed: Nov. 21, 1980

[30] Foreign Application Priority Data

Nov. 21, 1979 [IL] Israel .................................. 58773

[51] Int. Cl.³ ............................................ B05B 15/00
[52] U.S. Cl. ................................................ 239/542
[58] Field of Search .............. 239/542, 533.13, 533.14, 239/547; 138/43

[56] References Cited

U.S. PATENT DOCUMENTS

| 4,209,133 | 6/1980 | Mehoudar | 239/542 |
| 4,210,287 | 7/1980 | Mehoudar | 239/542 |
| 4,215,822 | 8/1980 | Mehoudar | 239/542 |
| 4,307,841 | 12/1981 | Mehoudar | 239/542 |

Primary Examiner—John J. Love
Assistant Examiner—Gene A. Church
Attorney, Agent, or Firm—Browdy and Neimark

[57] ABSTRACT

An emitter unit comprises a housing having defined therein an inlet and an outlet, a substantially planar inner wall portion of the unit having defined therein a groove, a recessed cavity communicating with one end of the groove and being of extended dimensions as compared with the width of the groove, a second and opposite end of the groove communicating with the inlet, an outlet bore in a base portion of the cavity communicating with the outlet and having a rim area substantially less than that of the cavity and at least one subsidiary recess, a resiliently flexible membrane juxtaposed with respect to the inner wall portion with one face thereof defining with the groove a flow restricting flowpath, with the cavity an outlet control chamber, and with the or each recess, at least one retaining cell, coupling device for coupling the or each cell with reduced pressure zones; the arrangement being such that with the inlet coupled to a water supply the membrane is exposed to the supply pressure the membrane is displaceable towards and away from the base portion of the cavity in accordance with pressure variations so as to stabilize the output rate of the emitter unit with respect to the variations and a pressure differential is set up across the membrane in the vicinity of the cell(s) and chamber so as to ensure that the membrane is maintained in contact with said inner wall portion in the region of the groove.

6 Claims, 5 Drawing Figures

Fig.3
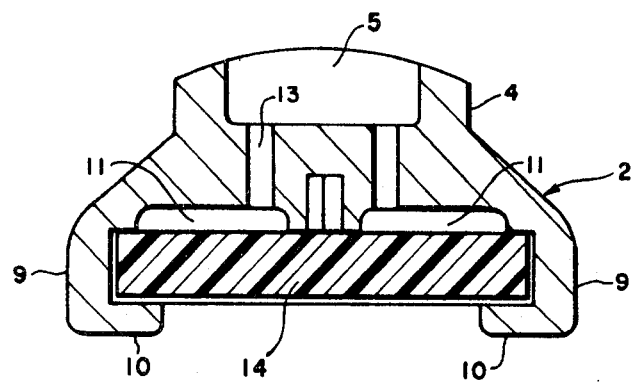
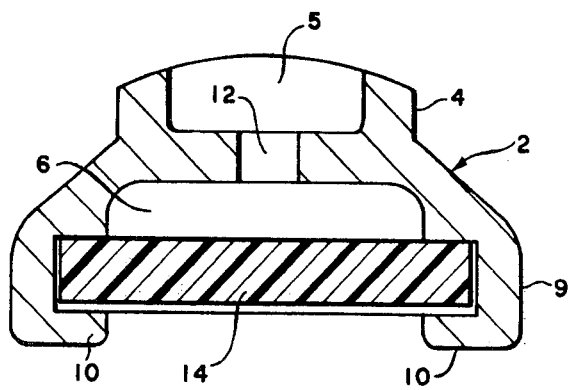
Fig.2

EMITTER UNIT

The present invention relates to emitter units.

In our earlier U.S. patent application(s) Ser. No(s). 962,632 (withdrawn in favor of continuation application Ser. No. 97,440, now U.S. Pat. No. 4,307,841), 962,688 now U.S. Pat. No. 4,210,287, and 171,048 we disclosed emitter units of the kind (hereinafter "an emitter unit of the kind specified") having an inlet and an outlet and a substantially planar inner wall portion, a groove formed in the inner wall portion, a recessed cavity formed in the inner wall portion and communicating with one end of the groove and being of extended dimensions as compared with the width of the groove, an outlet bore constituting or forming part of the unit outlet and formed coaxially in a base portion of the cavity and having a rim area substantially less than that of the cavity, a resiliently flexible membrane juxtaposed with respect to the inner wall portion with one face thereof defining with the groove a flow restricting flowpath and, with said cavity, an outlet control chamber, a second and opposite end of the groove communicating with the inlet; the arrangement being such that with the inlet coupled to a water supply an opposite face of the membrane is exposed to the supply pressure and the membrane is displaceable towards and away from the base portion of the cavity in accordance with pressure variations so as to stabilize the output rate of the emitter unit with respect to the variations.

With emitter units of the kind specified it is clearly essential that, during the operational use of emitter, the flow restricting flowpath should be clearly and sealingly defined and for this purpose it is necessary to ensure that the membrane firmly abuts those sections of the planar wall portions adjoining the groove.

In view of the fact however that a pressure differential is set up across the membrane in the region of the outlet control chamber, the membrane tends to sink into the chamber and this can well result in the portion of the membrane opposite the groove becoming detached therefrom with the consequence that the emitter no longer possesses a well defined effective flow restricting flowpath.

This disadvantage is particularly liable to arise where, as in the case of the emitter units disclosed in our prior patent specifications referred to above, the membrane is held against the inner wall portion under the forces exerted by the water supply pressure.

It is an object of the present invention to provide a new and improved emitter unit of the kind specified in which the above referred to disadvantages are substantially reduced or avoided.

According to the present invention there is provided an emitter unit of the kind specified wherein there is additionally formed in said inner wall portion, at least one subsidiary recess, said one face of said membrane defining with the or each recess, at least one retaining cell, coupling means for coupling the or each cell with reduced pressure zones such that when said inlet is coupled to said supply, a pressure differential is set up across said membrane in the vicinity of said cell(s) and chamber so as to ensure that said membrane is maintained in contact with said inner wall portion in the region of said groove.

Preferably the or each recess is coupled to said cavity in which case and during operational use of the emitter unit, the pressure in the cell(s) will equal that in the control chamber and be less than that of the water supply thereby giving rise to the desired pressure differential.

Alternatively, the or each recess can be formed with an aperture communicating with the outlet thereby ensuring that the pressure in the cell(s) is substantially lower than that effective on the second face of the membrane and in this way the provision of the pressure differential is ensured.

Preferably the emitter unit is provided with an elongated groove formed with a plurality of flow resisting baffles.

Figure 5:
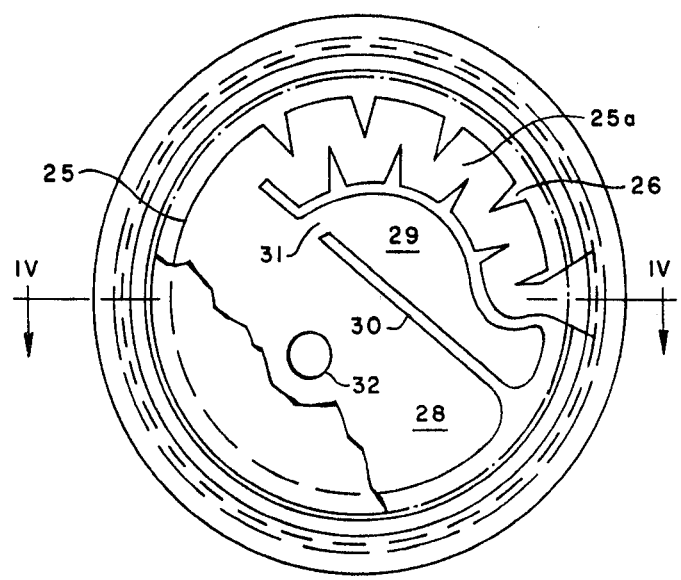
Figure 4:
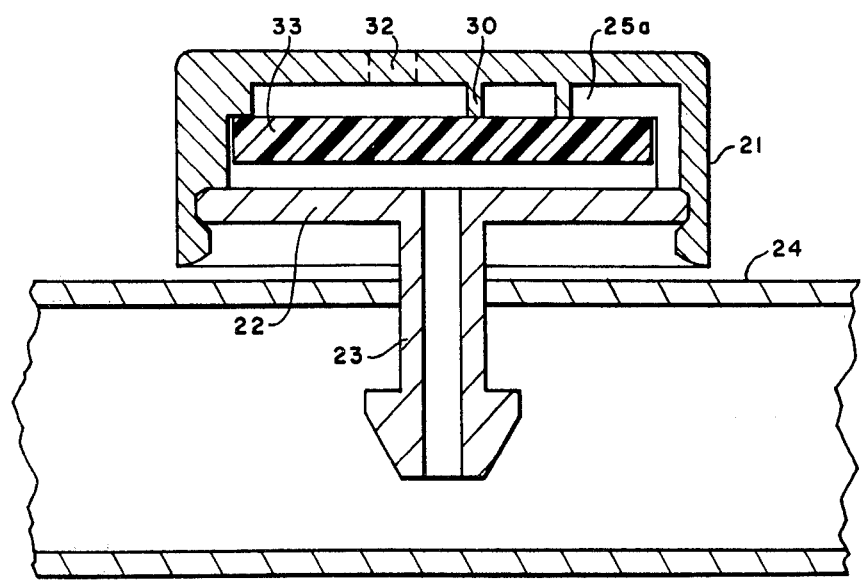

Various embodiments of emitter units in accordance with the present invention will now be described by way of example and with reference to the accompanying drawings in which:

FIG. 1 is a plan view from below of an emitter unit with its membrane removed in accordance with the present invention, FIGS. 2 and 3 are cross-sectional views of the emitter unit shown in FIG. 1 along the lines II—II and III—III, FIG. 4 is a cross-sectional view of an alternative form of emitter unit in accordance with the present invention shown coupled to an irrigation conduit, and FIG. 5 is a cross-sectional view of the emitter unit shown in FIG. 4 taken along the line V—V.

With reference to FIGS. 1, 2 and 3 of the drawings, there is here illustrated an emitter unit 1 of the general kind illustrated and described in our earlier copending patent application Ser. No. 53,463 and which, as is the case with the emitter units described in this earlier patent specification is designed to be heat welded to the inside wall of a thermoplastic conduit (not shown). Each emitter unit 1 comprises a relatively elongated shallow body 2 having an extended substantially planar wall portion 3 from which there extends upwardly, as shown in FIGS. 2 and 3 of the drawings, an elongated peripheral wall 4 defining an elongated well 5 and terminating in a peripheral edge portion.

Formed in the under-surface of the planar wall portion 3 is a substantially rectangular cavity-like recess 6 which communicates with one end of an elongated groove 7 formed with a pair of oppositely directed sets of flow resisting, substantially triangular baffles 8. Extending downwardly, (as seen in FIGS. 2 and 3 of the drawings) from the planar wall portion is a peripheral wall 9 terminating in inwardly directed flanges 10.

Extending along the elongated groove 7 on either side thereof is a pair of subsidiary recess 11. A through-going bore 12 extends through the planar wall portion 3 from a central position in the recess 6 so as to communicate with the well 5 and a pair of through-going bores 13 extend through the planar wall portions from end positions in the subsidiary recesses 11 so as to communicate with the well 5.

A rectangular, flexibly resilient rubber membrane 14 is retained by the flanges 10 and constitutes an emitter cover member which serves to define with the elongated groove 7 a flow restricting flowpath, with the cavity-like recess 6 an outlet control chamber and, with the subsidiary recesses 11 respective retaining cells.

A recess 15 constitutes an emitter inlet whilst the bore 12 and well 5 constitute together an emitter outlet. It will readily be seen that the surface area of the cavity 6 is very substantially greater than the surface area of the mouth of the bore 12 whilst the interior of the recesses 11 communicate the well 5.

In use, and with the emitter unit as described, heat welded at its peripheral end portion to the inner surface of a conduit (not shown) as described in our earlier U.S. Pat. No. 4,201,287, with the flow of irrigation liquid through the conduit, and once the pressure buildup of the liquid in the conduit has reached a certain minimum level the flexible membrane 14 is pressed against the rim of the groove 7 and of the cavity 6. Thus, a portion of the irrigating water flowing through the conduit passes through the flow restricting flowpath defined by the groove 7 and the flexible membrane 14 into the cavity 6 and out of the emitter via the bore 12 and well 5 so as to emerge from the conduit as a substantially pressureless drip. The outlet control chamber is defined by the cavity 6 with the membrane 14. The provision of the resiliently flexible membrane 14 and its location between the outlet control chamber and the interior of the conduit (now shown) ensures that the liquid pressure in the outlet control chamber is always a predetermined fixed amount below that prevailing in the conduit and the outflow rate from the emitter unit is maintained substantially invariant with respect to such pressure variations.

In view of the strong pressure differential across that portion of the membrane 14 opposite the outlet cavity 6 non-uniform forces are exerted on the membrane 14 and this may tend to result in a displacement of the membrane 14 away from the groove 7 and thereby the clear definition of the flow restricting flowpath is affected. This tendency is however overcome by the provision of the subsidiary recesses 11 constituting retaining cells located along the groove 7 on either side thereof. As indicated above these retaining cells are maintained at a pressure below the supply pressure and in this way a pressure differential is created across the membrane in the vicinity of these cells and this is instrumental in ensuring that, along the entire length of the groove 7 the membrane is kept in close contact with the planar wall portion. This is particularly important in connection with the initial portions of the groove remote from the control chamber seeing that in these initial portions the pressure in the groove is hardly less than that of the water supply and the absence of an effective differential pressure in these regions would otherwise result in the displacement of the membrane away from the planar wall portion.

As an alternative to the embodiment just described wherein the retaining cells are provided with through-going bores 13 effecting communication with the outlet well 5, the retaining cells can communicate directly with the outlet control chamber.

In an alternative embodiment shown in FIGS. 4 and 5 of the drawings, an emitter unit is constituted by a cap-like body member 21 into which is retainingly fitted a base member 22 provided with a coupling nipple 23 serving to mechanically and hydraulically couple the unit to a conduit 24. The body member 21 has an inner face in which is formed a central recess defined by a ridge 25 comprising an arc-like groove 25a formed with flow restricting baffles 26 communicating at one end thereof with an inlet 27 and an opposite end thereof with a pair of recessed cavities 28, 29 separated by a partition wall 30 of a height equal to the height of the defining ridge 25, the cavities 28, 29 communicating via a gap 31 in the wall 30. An outlet aperture 32 is formed in the body member 21 substantially centrally disposed with respect to the cavity 28. A flexible membrane 33 rests on the ridge 25, groove defining wall and partition wall 30 thereby defining with the cavity 28, an outlet control chamber, with the cavity 29a retaining cell and with the groove 25a a flow restricting flowpath. The pressure differentials effective on those portions of the membrane 33 adjacent the cavity 29a prevents the membrane 33 from becoming detached from the grooved portion when the portion thereof opposite the cavity 28 is sinking into this cavity.

In the embodiment just described the retaining cell is coupled to the outlet control chamber and in this way it is ensured that the pressure therein, during operation is less than that on the opposite side of the membrane.

The application of the invention is clearly not restricted to the use of emitter units having baffle type flowpaths.

What I claim is:

1. An emitter unit comprising a housing having defined therein an inlet and an outlet; a substantially planar inner wall portion having defined therein a groove, a recessed cavity communicating with one end of the groove and being of extended dimensions as compared with the width of the groove, a second and opposite end of the groove communicating with the inlet, an outlet bore in a base portion of the cavity communicating with said outlet and having a rim area substantially less than that of the cavity and at least one subsidiary recess; a resiliently flexible membrane juxtaposed with respect to the inner wall portion with one face thereof defining with the groove a flow restricting flowpath, with said cavity an outlet control chamber, and with the recess, at least one retaining cell, coupling means for coupling the cell with reduced pressure zones; the arrangement being such that, with the inlet coupled to a water supply, said membrane is exposed to the supply pressure and the membrane is displaceable towards and away from the base portion of the cavity in accordance with pressure variations so as to stabilize the output rate of the emitter unit with respect to the variations and a pressure differential is set up across said membrane in the vicinity of said cell(s) and chamber so as to ensure that said membrane is maintained in contact with said inner wall portion in the region of said groove.

2. An emitter unit according to claim 1 wherein the or each recess is coupled to said cavity.

3. An emitter unit according to claim 1 wherein the or each recess is coupled to the outlet of said unit.

4. An emitter unit according to claim 1 wherein said groove is elongated and said recesses extend along said groove on either side thereof.

5. An emitter unit according to claim 1 wherein said groove cavity and recess adjoin each other and are defined in a recessed body member of said unit and are defined by wall portions of uniform height against which said membrane is adapted to bear.

6. An emitter unit according to claim 1 wherein said membrane is adapted to be held against said cavity, recess and groove under the influence of water pressure.

* * * * *